Nov. 9, 1954  M. H. BINSTOCK  2,694,126
ELECTRICAL CONTACT MEMBER
Filed Feb. 28, 1952

WITNESSES:
John E. Headly
Wescott B. Norton

INVENTOR
Martin H. Binstock.
BY
Frederick Shapoe
ATTORNEY

United States Patent Office 2,694,126
Patented Nov. 9, 1954

2,694,126

ELECTRICAL CONTACT MEMBER

Martin H. Binstock, Pittsburgh, Pa., assignor to Westinghouse Electric Corporation, East Pittsburgh, Pa., a corporation of Pennsylvania Application February 28, 1952, Serial No. 274,031

2 Claims. (Cl. 200—166)

This invention relates to an electrical contact tip and a method of making the same.

Difficulty has been experienced in the past in brazing electrical contact tips composed of a mixture of refractory and conducting metals to a conducting metallic support member. The trouble arises in making a satisfactory brazed bond between the contact tip and the support member. When the members are incompletely brazed to one another, the bond will crack during operation thus resulting in failure of the contact member.

An object of this invention is to provide a refractory electrical contact tip composed of a sintered mixture of powdered refractory and conducting brazing metal, having a novel serrated base joining surface with brazing metal filling between the serrations thereby providing a substantially flat base surface that will facilitate brazing the contact tip to a metallic support member.

Another object of this invention is to provide a method of making an electrical contact tip that will facilitate brazing to a metallic supporting member, the contact tip being composed of a mixture of powdered refractory metal, powdered conducting metal, and powdered nickel, and having a serrated base surface, sintering the contact tip at a temperature sufficient to cause the conducting brazing metal to exude from between the serrations and fill the spaces therebetween, thereby forming a flat joining surface.

Other objects of the invention will, in part, be obvious and will, in part, appear hereinafter.

For a fuller understanding of the nature and objects of the invention, reference should be had to the following detailed description and drawing, in which.

In practicing the invention, a mixture in predetermined proportions of a powdered conducting brazing metal such as a silver, a powdered refractory metal such as tungsten, and a small but critical amount of powdered nickel is introduced into a mold and formed into a compact of a selected size and shape having a base composed of serrate projections, the projections having a critical angle of taper and height.

The ratios of the powdered conducting brazing metal, powdered refractory metal and powdered nickel may be varied according to the type of service to which the contact tip is to be subjected. Satisfactory results have been obtained with 20 to 50 parts by weight of conducting brazing metal, 80 to 20 parts by weight of refractory metal, and ½ to 2 parts by weight of powdered nickel. It is to be understood that mixtures of copper and silver may be used for the conducting brazing metal, and mixtures of molybdenum and tungsten for the refractory metal. It should be understood that small amounts of other metals may be present.

Figure 1:
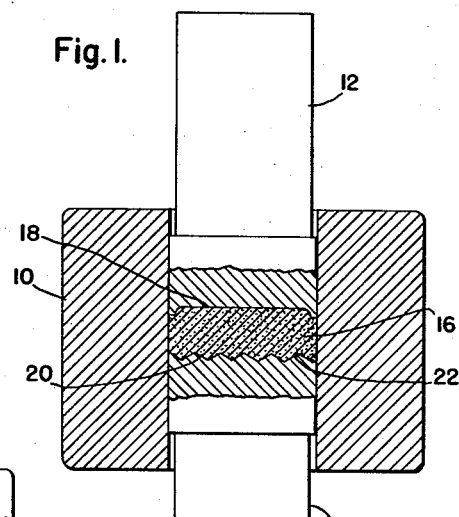
Figure 1 is an enlarged view in elevation, of apparatus suitable for molding the contact tip with parts cut away to show details.

Referring now to Fig. 1 of the drawing, a weighed amount of the mixture of powdered conducting metal, powdered refractory metal and powdered nickel is introduced into a molding die 10. A small amount of a conventional mold lubricant such as calcium stearate is included in the mixture of powders to facilitate molding. Pressures of the order of 25,000 to 50,000 p. s. i. are then applied to molding punches 12 and 14 cooperating with the die 10 to mold the powdered metals into a compact 16.

Figure 5:
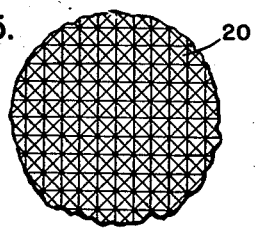
Fig. 5 is an enlarged fragmentary view of the joining surface of the contact tip taken on the line V—V of Fig. 2.

The molding punch 12 forms a suitable contact surface 18 on the compact 16 and the molding punch 14 is provided with serrated projections 22 to form on the compact a joining base surface composed of serrated projections 20. The projections 20 are shown as being of pyramidal form having four sides tapering to a point as shown in Fig. 5. Other pyramidal shapes, however, may be employed.

Figure 2:
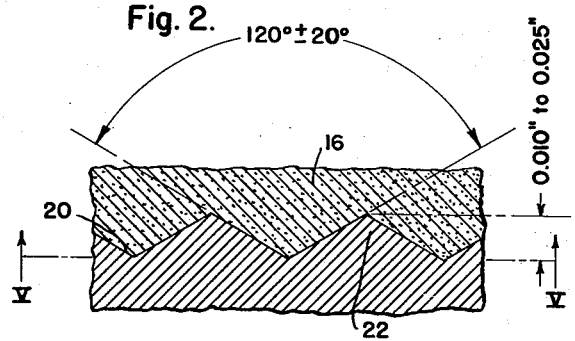
Fig. 2 is an enlarged fragmentary section of the molding punch and a contact tip, shown in Fig. 1.

The critical dimensions for the serrate projections 20 are illustrated in Fig. 2 of the drawing. The necessary range for the angle of taper of the sides of the projections has been found to be from 100° to 140°. The height of the projections should be from 0.015 inch to 0.025 inch.

Upon removal from the mold 10, the compact 16 is presintered at a temperature of from 700° C. to 900° C. for a period of time up to one hour in order to drive off gases and the mold lubricant. The compact shrinks a little under this treatment.

Figure 3:
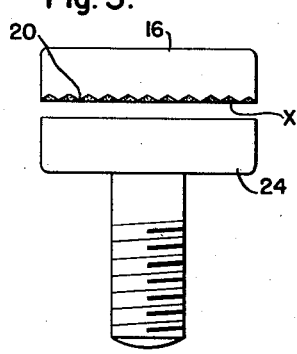
Fig. 3 is a view in elevation of a contact supporting base and contact tip before assembly.
Figure 4:
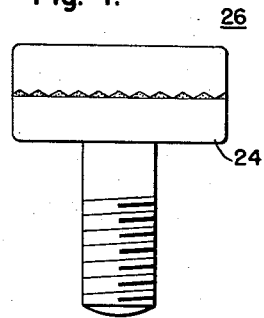
Fig. 4 is a view in elevation of the contact base and contact tip after assembly and sintering.

After presintering, the compact 16 is placed on a refractory plate, such as alumina, and then sintered at a temperature of from about 1200° C. to 1300° C., which is above the melting temperature of the good conducting metal, in a non-oxidizing atmosphere for a period of time of up to two hours. A surprising effect occurs during this sintering step, the conducting brazing metal of the compact exudes into the spaces between the serrated projections 20 and completely fills the spaces therebetween, as shown at "X" in Fig. 3 of the drawing, thereby forming a flat base joining surface, and no further exudation occurs. Without the nickel this desirable degree of exudation does not occur. During this final sintering step, shrinkage of the compact 16 in the order of from 13% to 17% of the original size occurs. The contact so formed is ready for brazing to a suitable support, such as support member 24, shown in Fig. 3 and upon heating to brazing temperature, with or without a flux, a contact tip 26 is produced as shown in Fig. 4.

The angle of taper and the height of the serrated projections 20 are important as they determined the size of the spaces between the projections 20 of the compact 16. If the spaces are too large, they are not completely filled by the exuding conducting brazing metal, and if the spaces are too small, the conducting brazing metal overflows the spaces. The spaces should be just filled so as to form a substantially flat joining surface.

The following example is illustrative of the invention:

Example

Sixty-five parts by weight of powdered tungsten is admixed with 35 parts by weight of powdered silver, and 1½ parts by weight of powdered nickel. One percent by weight of calcium stearate is used as a mold lubricant. The mixture is molded under a pressure of 40,000 p. s. i. to form a contact compact, the compact having serrated projections on one face. The compact is presintered at a temperature of 800° C. for one hour during which time the calcium stearate and gases are driven off. The compact is then sintered in hydrogen at a temperature of 1250° C. for two hours. Fifteen percent shrinkage of the compact occurs and a sufficient amount of silver exudes into the spaces between the serrated projections to form a substantially flat joining surface on the compact.

If desired, a brazing alloy may be applied thereafter to the surface of the contact base before brazing to a support member, but this is not necessary.

My novel contact tip has the advantage over the conventional contact tips heretofore used in that a stronger joint is formed when brazed to a contact support member and also a number of the conventional steps heretofore used in brazing are eliminated. The brazed joint is stronger because a completely brazed surface is formed with the support member, without cracks and weak spots.

Since certain obvious changes may be made in the above procedure and different embodiments of the invention could be made without departing from the scope thereof, it is intended that all matter contained in the above description and drawing shall be taken in connection with the accompanying claims and not in a limiting sense.

I claim as my invention:

1. A contact tip for electrical apparatus having a joining base surface and a contacting surface, said contact tip being composed of from 20 to 50 parts by weight of a powdered conducting brazing metal, from 80 to 50 parts by weight of a powdered refractory metal, and from ½ to 2 parts by weight of powdered nickel, the conducting brazing metal being selected from the group consisting of copper and silver, and the refractory metal being selected from the group consisting of molybdenum and tungsten, the joining base surface of said contact tip being formed by a series of tapered serrate projections having spaces therebetween, the serrate projections having a height of from 0.015 inch to 0.025 inch and the taper on said projections being from 100° to 140°, the spaces between the projections being filled with the conducting brazing metal of the contact tip, thereby forming a substantially flat joining base surface.

2. The combination of a support member and a contact tip, the contact tip having a joining base surface and a contact surface, said contact tip being composed of from 20 to 50 parts by weight of a powdered conducting brazing metal selected from the group consisting of copper and silver, from 80 to 50 parts by weight of a powdered refractory metal selected from the group consisting of molybdenum and tungsten, and from ½ to 2 parts by weight of powdered nickel, the joining surface of said contact tip being formed by a series of tapered serrate projections, the serrate projections having a height of from 0.015 inch to 0.025 inch and the angle of taper on said projections being from 100° to 140°, the projections defining spaces therebetween, a portion of the conducting brazing metal from the contact tip filling the spaces defined by said projections, and the joining base surface of the contact tip being brazed to the support member thereby forming a completely brazed joint between the support member and contact tip.

References Cited in the file of this patent

UNITED STATES PATENTS

| Number | Name | Date |
|---|---|---|
| 1,883,650 | Engle | Oct. 18, 1932 |
| 2,227,446 | Driggs et al. | Jan. 7, 1941 |
| 2,298,999 | Allen | Oct. 13, 1942 |
| 2,401,483 | Hensel et al. | June 4, 1946 |
| 2,641,670 | Graves | June 9, 1953 |
| 2,648,747 | Graves | Aug. 11, 1953 |